(12) United States Patent
Shafer

(10) Patent No.: US 12,129,733 B2
(45) Date of Patent: Oct. 29, 2024

(54) TWO-MATERIAL P AND A PLUG

(71) Applicant: ConocoPhillips Company, Houston, TX (US)

(72) Inventor: Randall S. Shafer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 232 days.

(21) Appl. No.: 17/724,449

(22) Filed: Apr. 19, 2022

(65) Prior Publication Data

US 2022/0243553 A1     Aug. 4, 2022

Related U.S. Application Data

(60) Division of application No. 16/774,741, filed on Jan. 28, 2020, now Pat. No. 11,346,176, which is a division of application No. 16/386,198, filed on Apr. 16, 2019, now Pat. No. 10,584,554, which is a continuation of application No. 15/948,322, filed on Apr. 9, 2018, now Pat. No. 10,316,612.

(60) Provisional application No. 62/484,624, filed on Apr. 12, 2017.

(51) Int. Cl.
| | |
|---|---|
| *E21B 33/12* | (2006.01) |
| *C09K 8/42* | (2006.01) |
| *C09K 8/44* | (2006.01) |
| *E21B 33/13* | (2006.01) |

(52) U.S. Cl.
CPC ............ *E21B 33/1208* (2013.01); *C09K 8/42* (2013.01); *C09K 8/426* (2013.01); *C09K 8/44* (2013.01); *E21B 33/13* (2013.01)

(58) Field of Classification Search
None
See application file for complete search history.

(56) References Cited

U.S. PATENT DOCUMENTS

| | | |
|---|---|---|
| 3,170,516 A | 2/1965 | Holland et al. |
| 3,208,530 A | 9/1965 | Allen et al. |
| 6,474,414 B1 | 11/2002 | Gonzalez et al. |
| 6,478,088 B1 | 11/2002 | Hansen et al. |
| 6,664,522 B2 | 12/2003 | Spencer |
| 6,828,531 B2 | 12/2004 | Spencer |
| 6,923,263 B2 | 8/2005 | Eden et al. |
| 7,152,657 B2 | 12/2006 | Bosma et al. |
| 7,165,607 B2 | 1/2007 | La Rovere et al. |
| 7,290,609 B2 | 11/2007 | Wardlaw et al. |
| 7,449,664 B2 | 11/2008 | Spencer |
| 7,669,653 B2 | 3/2010 | Craster et al. |
| 9,181,775 B2 | 11/2015 | Eden |
| 9,334,712 B2 | 5/2016 | Bakken |
| 9,708,882 B2 | 1/2017 | Carragher et al. |
| 9,932,791 B2 | 4/2018 | Walton et al. |
| 10,113,386 B2 | 10/2018 | Carragher |

(Continued)

FOREIGN PATENT DOCUMENTS

| | | |
|---|---|---|
| WO | 2011151271 A1 | 12/2011 |
| WO | 2014096858 A2 | 6/2014 |
| WO | 2017030806 A1 | 2/2017 |

*Primary Examiner* — Anuradha Ahuja
(74) *Attorney, Agent, or Firm* — Boulware & Valoir PLLC

(57) ABSTRACT

A plug for Plug and Abandonment (P&A) operations. The plug is a two-part plug of bismuth-based alloy and resin, allowing for sealing of an oil well using two different mechanisms with a shorter plug. The sealing can be rock-to-rock and/or cast-in-place.

10 Claims, 4 Drawing Sheets

(56) References Cited

U.S. PATENT DOCUMENTS

| | | |
|---|---|---|
| 10,145,194 B2 | 12/2018 | Dagenais et al. |
| 10,145,203 B2 | 12/2018 | Carragher |
| 10,161,215 B2 | 12/2018 | Carragher |
| 10,316,612 B2 | 6/2019 | Shafer |
| 10,526,866 B2 | 1/2020 | Ferg |
| 10,648,279 B2 | 5/2020 | Shafer |
| 10,738,567 B2 | 8/2020 | Shafer |
| 10,760,374 B2 | 9/2020 | Hearn et al. |
| 10,871,050 B2 | 12/2020 | Hearn et al. |
| 2006/0144591 A1 | 7/2006 | Gonzalez et al. |
| 2010/0006289 A1* | 1/2010 | Spencer ................. E21B 36/04 166/292 |
| 2018/0094503 A1 | 4/2018 | Wardley et al. |
| 2018/0148991 A1* | 5/2018 | Hearn .................... H10B 41/27 |

* cited by examiner

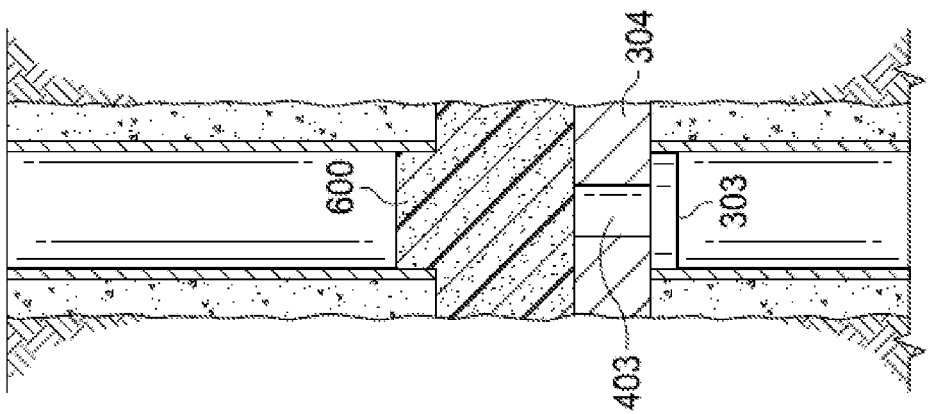
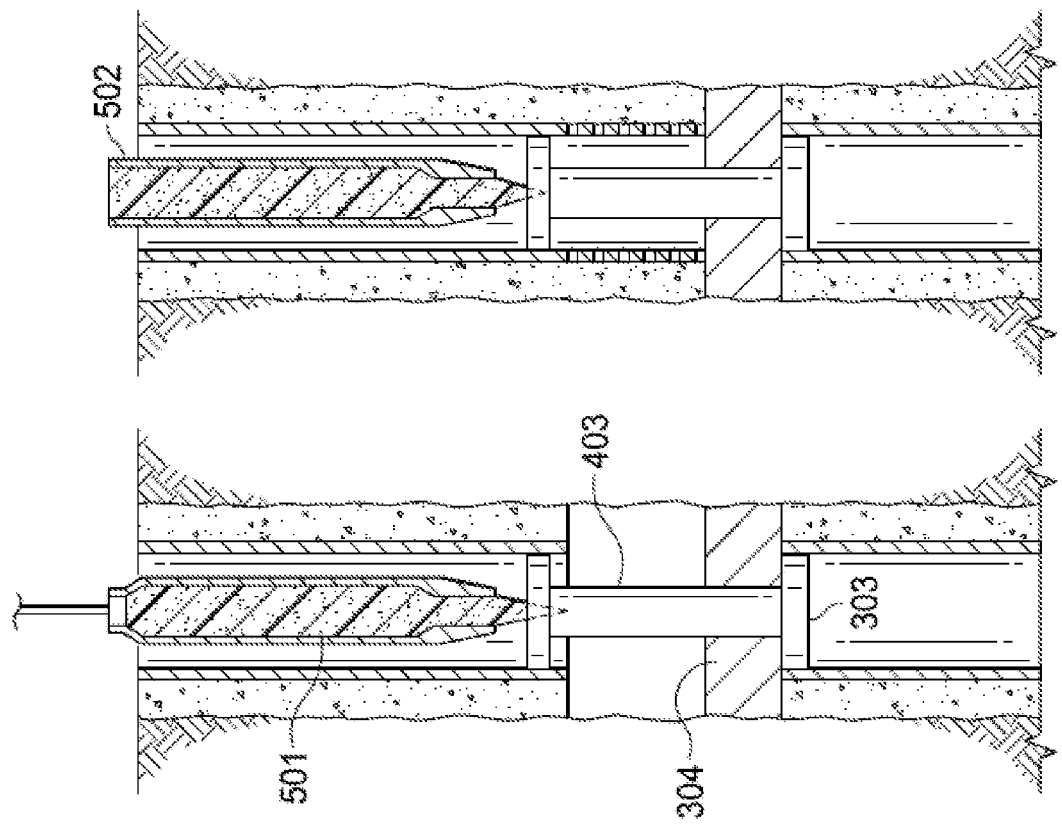
FIG. 5
FIG. 6

TWO-MATERIAL P AND A PLUG

PRIOR RELATED APPLICATIONS

This application is a divisional of U.S. patent application Ser. No. 16/774,741 filed on Jan. 28, 2020, which is a divisional application of U.S. patent application Ser. No. 16/386,198 filed on Apr. 16, 2019 (now U.S. Pat. 10,584,554 which issued on Mar. 10, 2020), which is a continuation of U.S. patent application Ser. No. 15/948,322 filed Apr. 9, 2018 (now U.S. Pat. 10,316,612 which issued on Jun. 11, 2019), which claims priority to U.S. Provisional Application No. 62/484,624 filed Apr. 12, 2017, all of which are incorporated by reference herein in their entirety for all purposes.

FIELD OF THE DISCLOSURE

The disclosure relates to plug and abandonment operations, and specifically to a two-material plug that has multiple sealing mechanisms and improved structural integrity over the use of either material alone.

BACKGROUND OF THE DISCLOSURE

There are several thousand active oil and gas wells located around the world, with thousands more to come on-stream in the next ten years. The wells differ in design, size, cost and economic benefit, but have one thing in common—sooner or later they will be decommissioned and abandoned.

The decision to plug and abandon (P&A) a well or field is invariably based on economics. Once production delivers less than the operating expenses, it is time to consider abandonment. In some situations, the decision is made with the knowledge that considerable reserves remain, but the cost to extract these resources is more than the projected income.

There are regulatory requirements associated with the P&A process to ensure that strata, particularly freshwater aquifers, are adequately isolated. The plug's length, cross-section, position and verification tests are typically regulated and depend on the type and location of the well being plugged. Thus, the cost to P&A a well can vary by many millions of dollars depending on location, and whether the well is offshore or onshore. Minimizing costs, without sacrificing well integrity, is critical to operators, who make a significant investment with no financial return in the case of P&A operations.

FIG. 1 displays a simple schematic of a basic plug. A modern requirement for a permanent well barrier is that it must include all annuli, extending to the full cross section of the well and seal both vertically and horizontally. In FIG. 1, a cement plug (104) is sealing vertically inside the casing and sealing both horizontally and vertically in the casing-formation annulus (102) above the casing shoe (103). However, cement is easily contaminated with mud, which results in placement issues and often results in plug failure.

Because cement is susceptible to failure if contaminated by drilling or other fluids, yet long length cement plugs are required, other materials have been investigated for use as plugging material. Resins seal by adhesion, and have resistance to many caustic and corrosive chemicals, excellent mechanical properties, such as high strength and high shear, and flexibility and toughness after setting. However, resin plugs can be more difficult to set successfully because of the relatively complex chemistry and the need for time to cure. Further, resin plugs will fall down the well bore and annulus unless the bore and annulus are plugged. They must be set on a base and the annulus sealed. Shrinkage of the resin can also occur as it cures unless formulated correctly and can lead to micro-annuli and cracks in the sealant and/or lack of bonding of the seal, plug or connection to its surroundings.

Although cement and resin are the most common plug materials, improvements in plug composition and methods are desired to reduce costs. One alternative is to "cast-in-place" a metal plug. A eutectic alloy, such as an expandable bismuth alloy, is heated in place to form a molten liquid metal that easily penetrates small crevices and cracks, and hardens in place forming a tight plug. The specific gravity of the metal being much higher than any fluid, results in effective placement. A heater tool, described in WO2011151271 and WO2014096858, is commercially available from BiSN Oil Tools, and can heat such cast-in place bismuth alloy plugs. The BiSN Wel-lok M2M Bridge Plug™ can run on standard wireline, slick line or coil tubing. It uses a bismuth-based alloy that is melted in situ by a chemical reaction heater that uses materials, such as thermite, to generate heat. However, this tool can only heat a limited volume of alloy at a time, and thus other methods and tools are still needed for P&A.

Thus, there still exists a need to improve plug formation in P&A operations while also decreasing cost and time. Ideally, the new plugs would be safe, create a reliable barrier, be cost effective, and both faster and easier to perform than current methods.

SUMMARY OF THE DISCLOSURE

Described herein is a new plug and method for plug and abandonment operations. Specifically, the new plug combines resin and a eutectic alloy to provide two redundant sealing mechanisms. This results in a shorter plug being needed for an improved sealing. Methods of installing the plug are also described.

Plugging and abandonment (P&A) regulations vary among states and between countries, but all regulations prescribe the depth intervals that must be plugged, as well as the materials that are allowed in plugging practices. For instance, in the North Sea, current P&A guidelines require plugs between 30 to 50 meters in length. To set such plugs, the wellbores undergo section milling, or perforation, wash and cement (PWC) processes. Both operations require substantial amounts of time and exorbitant cost. Further, milling or perforating 30-50 meters is not always economical or feasible, especially where the area to be plugged has multiple strings of casing that need to be removed.

Shorter plugs would require less casing being removed and reduce costs. One proposal for reducing the size of plugs is to utilize more than one material for the plug. For example, one option that has been presented is the use of two-material plugs using cement and resin. Generally, these plugs consist of a base plug, annulus seal, a resin layer, and then a cement layer. However, the resin requires time to set before the cement can be placed, thus delaying the plugging operation. Further, the cement is used just to hold the resin in place and is not a rock-to-rock plug of the formation. The problem with this plug is the time to set, including the based plug and annulus seal. If the annulus or base is not sealed correctly, all the resin could fall down the well bore or annulus as the resin will have a higher specific gravity than the fluid in the well.

In response to the long-felt need for better plugs that are smaller and more economical to place, Applicant has developed a two-material plug that overcomes the problems associated with the resin/cement plug. Specifically, the currently described plug utilizes eutectic alloy-based material and resin to form the seals. The eutectic alloy material, preferably bismuth-based, is added to the wellbore first, where it undergoes a heating step to melt the alloy, allowing it to expand and form a "cast-in-place" metal seal. This alloy plug acts as a base for the resin while sealing the annulus and wellbore with a rock-to-rock plug. This metal seal, along with the sleeve or frame of the heater used to melt the alloy, provides a structural component for the resin to attach thereto. The resin is the second layer to be added and it too forms a rock-to-rock seal that is cast-in-place across the wellbore as well as sealing the heater frame.

The order of the materials used in the plug is important. The bismuth-based alloy is immiscible with fluids in the wellbore and is corrosive resistant. Thus, no long-term failure due to fluid contact is expected. By placing the resin above the metal seal, the resin, which can also be immiscible in the fluids, is protected from hydrocarbon contact that can negatively affect the resin. As such, the alloy forms the base and seals the annuli. Further, the flexural failure of the resin section is reduced through the use of the metal plug, and the heater sleeve and its components, as reinforcement. This is analogous to steel reinforcement in concrete.

The described plug has a wide potential use in plugging operations, and can be used in all offshore producing areas. Further, smaller openings are needed for accessing the annular space. The described plug is expected to decrease abandonment costs by 25% or more for wells that have two strings of casing across the area to be plugged.

This new plug has many advantages over currently used plugs and other proposed two-material plugs. First, the two materials use different sealing mechanisms. The eutectic alloy seals by expansion and the resin seals by adhering to a surface. This reduces the probability of plug failure because either of the materials can plug the wellbore on its own and has different properties and thus differential failure rates under the same conditions. Further, the eutectic alloy layer acts as a plug, annulus seal, and base for which the resin can be placed. This not only gives the resin something to adhere to, but the metal seal prevents the resin from running down the sides of the wellbore or from contacting reservoir fluids. The metal plug and various components such as the heater sleeve also reinforce the resin. In large diameter wellbores, flexural failure of resin plugs is a concern. However, with the metal plug and its components above in the center of the wellbore, the effective diameter of the resin plug is reduced. The resin adheres to the components in the center of the casing. Finally, both materials are immiscible with the water-based fluids in the reservoirs or fluids used during P&A operations.

The eutectic alloy is preferably a bismuth-based alloy. Bismuth alloys are a preferred cast-in-place abandonment plug material because bismuth expands 1-3.32% on solidification. Bismuth also has unusually low toxicity for a heavy metal. Furthermore, Applicant has tested these alloys and determined that the liquid alloy does not mix with other fluids, like cement does. Thus, the channeling common in cement plugs is avoided.

Exemplary bismuth-based alloys are described in U.S. Pat. No. 7,290,609. As a general rule, bismuth alloys of approximately 50% bismuth exhibit little change of volume (1%) during solidification. Alloys containing more than this tend to expand during solidification and those containing less tend to shrink during solidification. Additional alloys are described in US20150368542, which describes a bismuth alloy comprises bismuth and germanium and/or copper. Preferably, the bismuth-based alloy is eutectic. Additional eutectic alloys to plug wells or repair existing plugs in wells are described in U.S. Pat. No. 7,152,657; US20060144591; U.S. Pat. Nos. 6,828,531; 6,664,522; 6,474,414; and US20050109511.

U.S. Ser. No. 62/402,796, filed Sep. 20, 2016, and incorporated herein in its entirety for all purposes, also describes bismuth alloy abandonment plugs and methods of setting them. In some embodiments, the bismuth alloys are preferred due to their low melt temperatures, ease of use and robustness.

A low-melting point bismuth-containing alloy such as "Rose's metal", "Kraft's alloy" or "Homberg's alloy", or any other suitable bismuth alloy is used. Such alloys are unusual in that they have a higher density in liquid form than in their solid state and therefore expand upon solidification. Once deposited in a well they lose heat into the surrounding environment, solidify, and expand to form a very secure plug within the well. Furthermore, there are commercially available tools and prototype tools are being developed that can heat bismuth alloy pellets downhole, such as the Wel-Lok, thus allowing the use of these materials as cast-in-place abandonment plugs, but with no nonmetal components that could deteriorate.

The resin can be any resin typically used in P&A operations. Thermosetting resins have been used in wells (oil, gas, water or even waste disposal wells) before. Those having a thermal expansion coefficient significantly greater than $10^{-3}$ vol % per ° C. may in principle be used, as long as shrinkage occurring during curing is compensated for. Also, mixtures of resins may be used in the presently described plug.

Resin sealing materials include ThermaSet® by Wellcem AS, CannSeal® by AGR, and the WellLock® resin system by Halliburton. M&D Industries also makes resin plugging materials, including LIQUID BRIDGE PLUG® with a range of hardeners and accelerators. The WellLock® resin, for example, uses cross-linking between an amine hardener and epoxides, resulting in a cured three-dimensional infinite polymer network, and can be deployed without negative impact from exothermic reactions triggered by water.

A two-material total plug length of less than 15 meters, each portion being less than 5 meters, preferably less than 2 meters, will provide the same protection as the typically 30-50 meter cement plugs. The two-material plug has two different sealing mechanisms, both materials being immiscible with P&A work fluids (low level contamination), and both can use gravity segregation for placement. Their complimentary properties and different sealing mechanisms make them as effective as longer cement plugs.

In forming the metal seal, a tool that includes storage for the alloy as either pellets or a layered metal, a heater, a sleeve or frame for holding and protecting the heater, and a base or canister in which the alloy is stored will be needed to place at least the first load of alloy. The sleeve or frame protects the heater from damage as it is lowered downhole and prevents direct contact with the alloy, which could potentially solidify therewith and prevent the heater from being retrieved. Once the heating is finished, the heater can be removed, leaving an open sleeve with additional attachment points for the resin.

A base plug can be used for setting the metal plug, or the components of the heater can provide a base that is retained in the plug on removal of the heater portion. However, the base may be optional, as these alloys tend to not travel very far before they cool and harden, thus providing their own base.

Multiple additions of alloy pellets may be needed to build the appropriate amount or height of alloy. Thus, the first load of alloy can be placed by the tool, such that the alloy will be heated, and then cooled into the seal. A second, third, or more load of alloy can then be placed using an e.g., dump bailer. The top of the open sleeve can be plugged with a "dummy" heater, or cap, while dumping the alloy. The "dummy" heater would then be pulled to allow for placement of a thermite-containing heater. The thermite-containing heater is ignited to heat the additional loads of alloy to grow the height of the metal plug.

Once the metal alloy has been placed, the heater is removed (leaving the sleeve behind) and the resin is added on top of the metal seal and heater sleeve. The resin attached and adheres to the metal seal and the frame or sleeve that housed the heater. It is expected that the top of the tool can be removed once the initial metal seal is set, allowing for the removal of the heater, and opening up of the heater sleeve and base for resin attachment.

For placing the plug rock-to-rock, parts of the wellbore must be removed to allow annular access. This can be accomplished using section milling or perforation/wash operations. However, a smaller section of opening(s) is needed because the plug will be shorter than the traditional all cement or all resin plugs. However, any method of removing the strings is acceptable, including various means of cutting the casings and other tubulars, and/or specific design of cuts or removal of the strings.

Both layers of the two-material plug are expected to expand to fill the openings in the casing and form a rock-to rock (i.e. the seal contacts the formation rock). However, in some embodiments, some end or terminal portions of the plug may not be rock-to-rock.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, a "P&A" refers to plug and abandon. Regulations require that the plugs be of sufficient quality to be "permanent," never allowing formation fluids to leak. However, it is recognized that even a permanently plugged and abandoned well may be reopened at a later time for various reasons. Therefore, "permanent" does not imply that the well will not be reopened, but instead refers to the quality of the plug—it needing the potential to last permanently. That said, most plugs probably won't last forever, and some degree of flexibility in meaning can be accommodated by these terms of art.

The most effective way to prevent hydrocarbon migration in wells that have been plugged and abandoned is to create a "rock-to-rock" seal. This means the seal reaches to the formation walls.

As used herein, "casing string" and "string" are used interchangeable to refer to a long section of connected oilfield pipe that is lowered into a wellbore and cemented. Often, multiple strings of concentric casings are used in a wellbore.

As used herein, "dump bailer" refers to a wireline or slickline tool used to place small volumes of cement slurry, or similar material, in a wellbore.

The expression "resin" refers to "classic" thermosetting resins, as well as ductile, vulcanizable rubbers. The cured resin is expanded to at least the volume occupied by the resin prior to curing to compensate for shrinkage.

A "Perforation" tool makes a plurality of discreet holes of roughly equal size and even distribution, leaving the tubing otherwise intact.

The term "cast-in-place" refers to the formation of a seal in situ in the wellbore.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| P&A | Plug and abandonment |
| PWC | perforation/wash/clean |

BRIEF DESCRIPTION OF THE DRAWINGS

FIG. 5. Place of resin on top of metal seal.

FIG. 6. Two-material plug per one embodiment of the present description.

DESCRIPTION OF EMBODIMENTS OF THE DISCLOSURE

Figure 1:
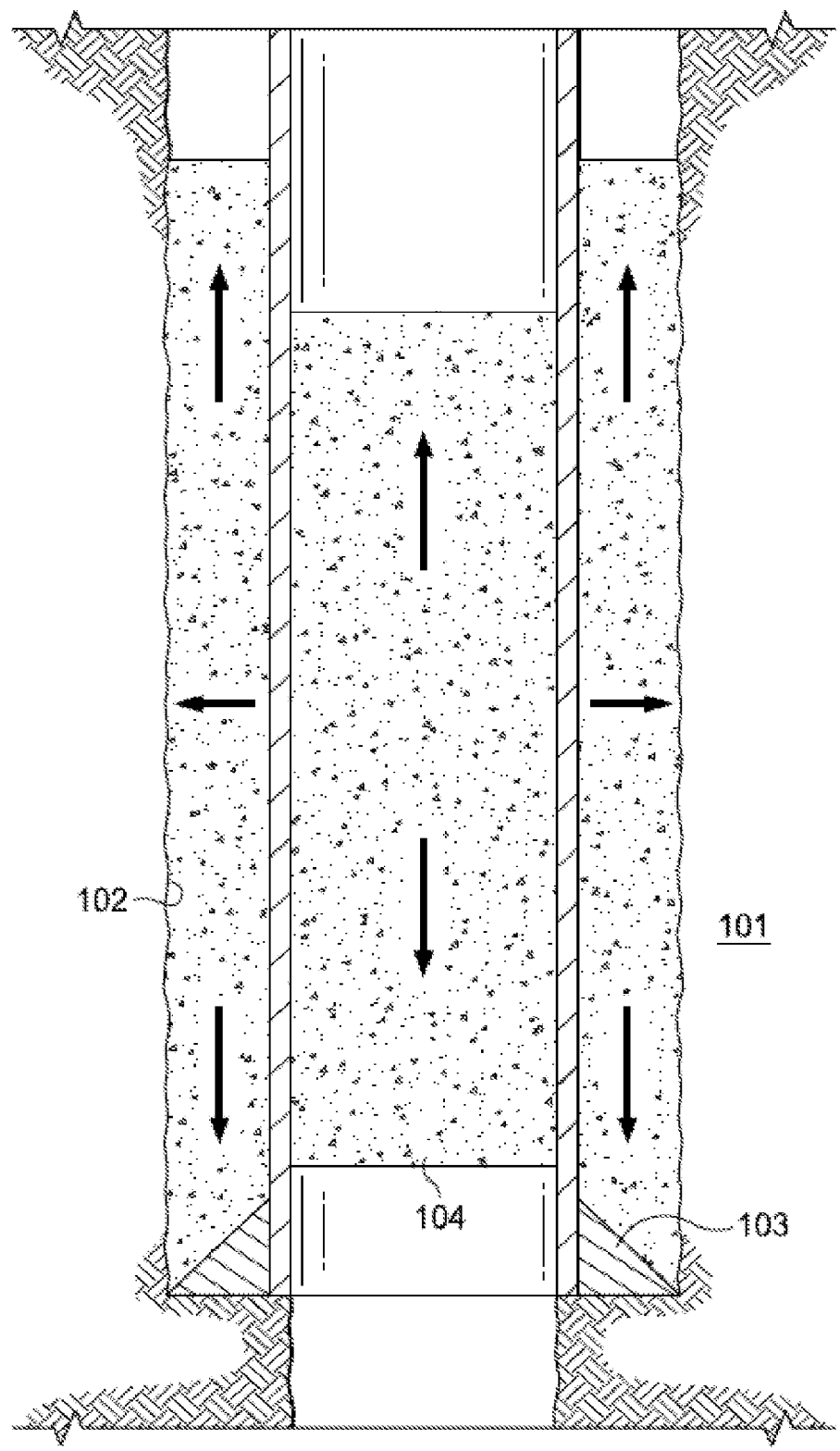
FIG. 1. Schematic of a traditional cement plug in a wellbore.

The invention provides a novel plug for wellbore plug and abandonment operations. This novel plug utilizes a eutectic alloy and a resin to form a two-component plug. Because each material seals the wellbore using different mechanisms, there is a redundancy in the seals. This allows for a smaller amount of materials to accomplish the same level of sealing as traditional plugs, and a smaller amount of tubular will need to be removed. The combined two-material plug has greater integrity under wellbore conditions than a similar total length plug of either material alone.

The present methods include any of the following embodiments in any combination(s) of one or more thereof:

A method of plugging a well during plug and abandonment operations comprising:

a) deploying a first tool downhole to remove or perforate both an inner tubular and/or exterior casing at a section of well to be plugged;
b) deploying a second tool downhole, said second tool having a eutectic alloy in a storage space, a sleeve for holding a heater and an optional base;
c) deploying a heater downhole in said sleeve;
d) heating said eutectic alloy with said heater to form a molten alloy;
e) allowing said molten alloy to expand and solidify to form a cast-in-place metal plug that fills at least part of said section of well to be plugged and seal the annulus;
f) removing said heater, but not said sleeve;
g) deploying a resin downhole on top of said metal plug;
h) curing said resin, wherein said cured resin adheres to and covers said cast-in-place metal plug and said sleeve; and
i) wherein said cast-in-place metal plug and said cast-in-place resin plug form a single two-material plug.

A method of plugging a well during plug and abandonment operations comprising:

a) removing or perforating or opening both an inner tubular and an exterior casing at a section of well to be plugged;
b) optionally deploying a base plug at or near said section;
c) deploying a eutectic alloy downhole on top of said base plug or at said section;
d) heating said eutectic alloy to form a molten alloy;
e) allowing said molten alloy to expand and solidify to form a cast-in-place metal plug that fills at least part of said section of well to be plugged;
f) removing said heater;
g) deploying a resin downhole on top of said cast-in-place metal plug; and,
h) curing said resin to form a resin plug, wherein said resin plug and said cast-in-place metal plug form a single two-material plug that is a rock-to-rock plug.

A method of plugging a well during plug and abandonment operations comprising:

a) deploying a first tool downhole to remove or perforate both an inner tubular and exterior casing at a section of well to be plugged;
b) deploying a second tool downhole having a base, a sleeve erected therefrom for holding a heater, a heater and an alloy, wherein said alloy is stored above said base and around said sleeve;
c) heating said eutectic alloy with said heater to form a molten alloy;
d) allowing said molten alloy to expand and solidify to form a cast-in-place metal plug that fills at least part of said section of well to be plugged;
e) adding additional eutectic alloy to said well and repeating steps c-d until
a predetermined height of cast-in-place metal plug is formed;
f) removing said heater but not said sleeve;
g) deploying or pouring a resin downhole on top of said cast-in-place metal plug;
h) curing said resin to form a resin plug, wherein said cured resin adheres to said cast-in-place metal plug, further wherein the cure resin covers said cast-in-place metal plug and said sleeve of said second tool; and
i) wherein said cast-in-place metal plug and said resin plug form a single two-material plug that is a rock-to-rock plug.

Any method herein, further comprising evaluating the seal of said single two-material plug.
Any method herein, wherein said first tool performs section milling.
Any method herein, wherein said first tool performs perforation and wash operations.
Any method herein, wherein said first tool opens and expands said inner tubular and exterior casing.
Any method herein, wherein said eutectic alloy comprises bismuth.
Any method herein, wherein said resin is a thermosetting resin, a vulcanizable rubber or combinations thereof.
Any method herein, wherein said second tool is a Wel-lok tool.
Any method herein, wherein additional alloy is added to said wellbore and the hating and solidfying steps are repeated.
Any method herein, wherein said plug is less than 15 meters.
Any method herein, wherein said cast-in-place metal plug is less than 5 meters.
Any method herein, wherein said cast-in-place metal plug is less than 2 meters.
Any method herein, wherein said rock-to-rock plug is less than 5 meters.
Any method herein, wherein said two-material plug has enhanced integrity when compared to an equivalent total length of either material alone.
Any method herein, wherein said method requires less time than a method using a two material plug comprising resin and cement.
A method of P&A, wherein said method deploys a P&A plug that has two materials being complementary in sealing processes, one material being an expansion metal and one material being an adhesion resin.
Any method herein, wherein deploying said P&A plug that requires less time than two material plug comprising resin and cement.
Any method herein, wherein said two material plug has enhanced integrity when compared to either material alone.
A plug for a wellbore comprising:

a) an eutectic alloy base layer, and
b) a resin layer above and in physical contact with said eutectic alloy base layer.

Any plug herein, wherein said eutectic alloy base layer and/or said resin form a "cast-in-place" seal.
Any plug herein, wherein said eutectic alloy base layer is bismuth and/or said resin is a thermosetting resin, a vulcanizable rubber or combinations thereof.
Any plug herein, further comprising a sleeve for a heater embedded in the resin and eutectic alloy base alloy layer.

The present invention is exemplified with respect to the description below and FIG. 2-6. However, this is exemplary only, and the invention can be broadly applied to any wellbore that is being abandoned. The following examples are intended to be illustrative only, and not unduly limit the scope of the appended claims.

Figure 2:
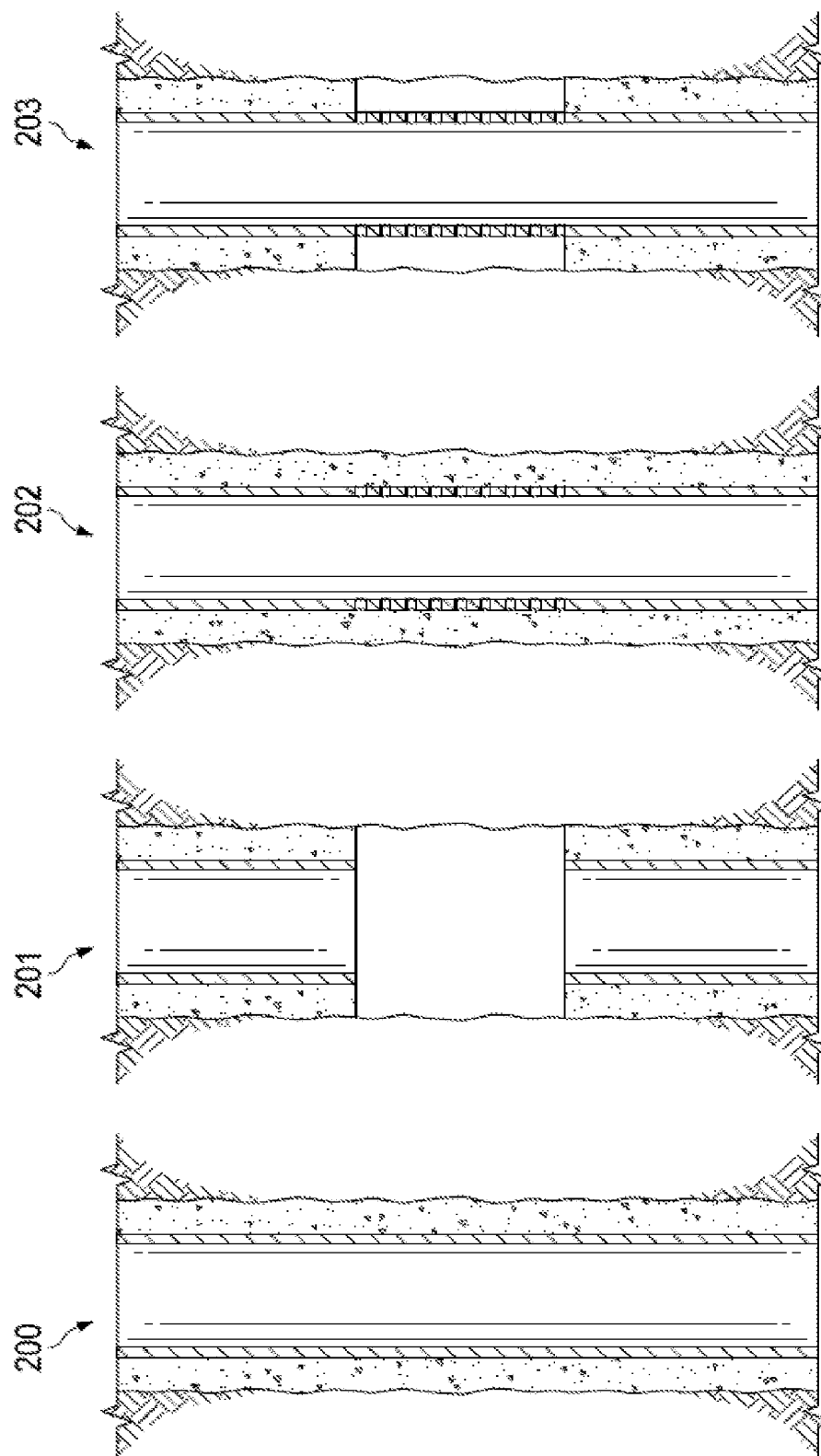
FIG. 2. Depiction of a wellbore in its initial state and after portions thereof are removed for plug placement using section milling, perforation, or perforation/wash techniques.

The first step in plugging a wellbore is to create access to the annulus by cutting through the strings. FIG. 2 displays wellbores that has been modified by the most commonly used methods to contrasts these methods with a wellbore in its initial state (200). The most commonly used options to access the annulus are section milling (201), wherein an entire section of the casing string is removed; slot perforation (202), wherein slots are cut into the casing string over; and perforation/wash (203), wherein slots are cut into the casing string and a circulated fluid cleans the annular space to remove debris from the perforations.

Annular access allows for placement of rock-to-rock seals using the alloy and/or resin. While each of the commonly used techniques to gain access has its own advantages or disadvantages, any method of opening access to the annulus can be used with the described plug. For instance, Ser. No. 62/470,234, filed Mar. 11, 2017, describes a technique that cuts helical coils into the strings to create openings in the casing that will aid in the formation of multiple o-ring type mini-seals as the material expands into the opening.

Once the strings are cut or milled, operations to set the plug material can proceed. The section of the wellbore that is milled or perforated is called a "window." The eutectic alloy, preferably a bismuth-based alloy, is placed at the bottom of the window and heated. The alloy is inert, environmentally friendly and is not affected by corrosion, hydrogen sulfide or acidic attack. A base plug may be needed to support the molten alloy in some embodiments, but in other embodiments, a tool is used that provides its own base, or the base is omitted and the molten alloy forms its own base.

Though this plug is being described as being set in a wellbore with an intentionally opened annulus, the bismuth-based alloy can also be set in undamaged, damaged or corroded casing due to the molten alloy flowing into any profile or shape.

The metal alloy plug must be placed first because its acts as a base of support, seals the annuli, and an attachment point for the resin. Any wellbore tool, such as a dump bailer, with the ability to place pellets or sheets of the alloy can be used. Depending on the chosen tool, a base plate may have to be installed at or below the bottom of the window to prevent the molten alloy and/or alloy pellets from draining down the wellbore. The base plug need not be perfect, and may be omittable, because the alloy will flow a fairly limited distance before solidifying sealing the well bore and annulus. Any known base plate and methods of installation can be used.

Figure 3A:
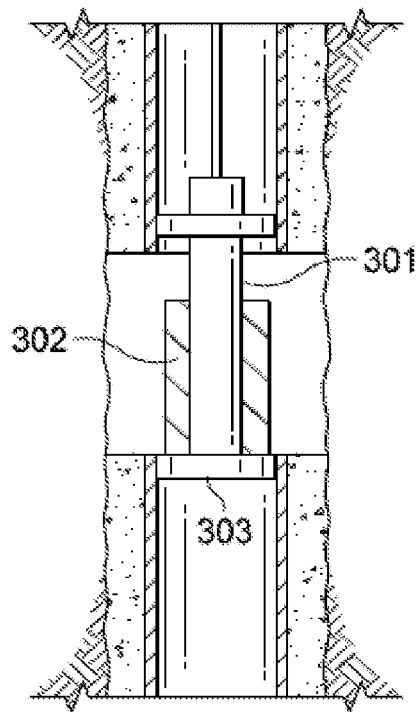
FIG. 3A. A section of milled wellbore having a WelLok™ tool with alloy metal.
Figure 3B:
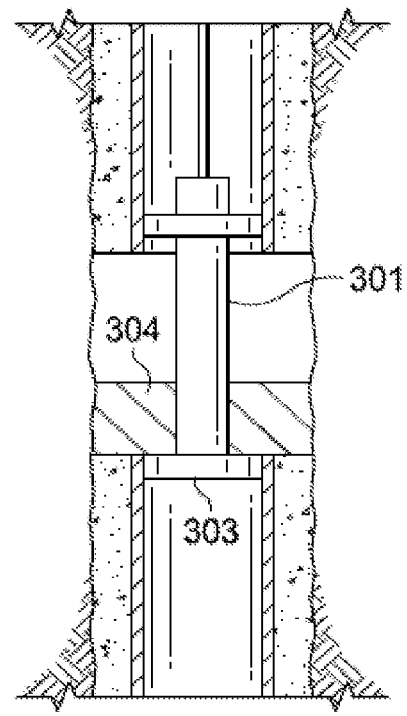
FIG. 3B is the same well after the alloy metal has been heated and cooled to form a rock-to-rock seal.

Preferably, the alloy is placed using a Wel-lok™ tool from BiSN Oil Tools. The Wel-lok™ tool is preferred over other tools because it has a storage space for alloy layers (302) and a heater (301) in a sleeve, as shown in FIG. 3A. Further, the bottom of the Wel-lok™ tool can act as a cooling shelf (303) for the molten alloy to solidify (304) upon after it flows out of the storage space, as shown in FIG. 3B.

The Wel-lok™ tools have a bismuth-based alloy that is melted in situ using a chemical reaction heater. The molten alloy is then able to flow from its storage space on the tool and expand into the annulus space towards the formation. As mentioned above, the bottom of the Wel-lok™ tool has a shelf which will be several degrees cooler than the molten alloy and can act as a cool area to slow the flow of the heated alloy so that it is not lost down the well, but instead cools in the target region.

If more bismuth-based alloy is needed to adjust the height of the metal seal, it can be added using a dump bailer or other tool. The sleeve can be temporarily plugged with a "dummy" heater or some other blocking device during the addition of new alloy, then removed as needed for placement of the actual heater (301) in the sleeve. As before, a heater (301) is placed in the sleeve to heat the new alloy. As the metal seal is created, the frame or sleeve encompassing the heater will become part of the seal and provide an additional surface for the resin to adhere. The frame or sleeve is generally a hollow open-ended shape, usually tubular to maximize the space usage in a tubular well. However, other shapes are possible, such as sleeves having a square or triangular cross section.

Figure 4A:
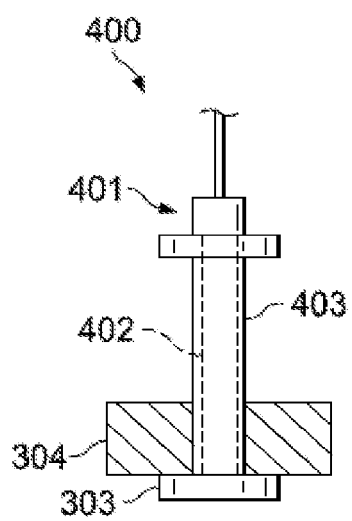
FIGS. 4A and 4B. Removal of heater per one embodiment of the present description.
Figure 4B:
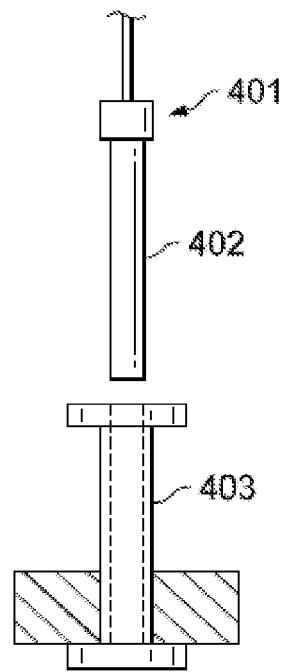

The top (401) of the Wel-lok™ (400) or similar tool should be removable to pull the heater (402) out of its sleeve (403), per FIGS. 4A and 4B. The top (401) can be removed by shearing it off or melting pins that were used to keep the top and heater in place. For instance, the top can be removed using a cutter. Removing the heater would open the sleeve or frame and allow for the resin (501) to be placed in the open frame, per FIG. 5. The added surface area of the open sleeve or frame leads to more attachment points for the resin to adhere. Enough resin, however, is needed to fully cover the sleeve or frame to prevent any imperfections or open pockets in the resin seal.

In evaluating the plug, the metal alloy portion can be pressure tested within hours, which provides significant costs savings when compared to cement or resin, which can require one or more days to set. Because true metal-to-metal and metal-to-wall seals are made, a permanent gas/liquid tight seal is created for any oil well abandonment.

If the metal alloy portion of the plug is found to have created a useable seal, then the resin can be added to the top of the metal seal and frame using a dump bailer (502), poured from the surface and fall through the P&A fluid to the metal alloy plug (503) or placed with pipe, tubing, or coil tubing (504). The resin will flow through the frame from the heater and flow out towards the formation. As the resin is immiscible and typically has a specific gravity higher than fluid in the well bore it will fall and displace the fluid on top of the metal plug.

Access to the annulus can be obtained by methods outlined previously, section milling, perforation, PWC, or expansion and opening, and combinations thereof. The plug placement process is basically the same for these methods. There may be variations in volume of metal alloy and resin. For example, PWC might require a longer metal plug to insure the annulus is sealed because alloy must flow through perforations to seal the annulus. If a well is just perforated, then a longer resin plug may be placed and squeezed into the perforations.

Enough resin is needed to plug the remaining open space in the casing strings and cover the top of the heater sleeve while compensating for shrinkage that occurs as the resin cures, as the final resin plug (600) is exemplified in FIG. 6.

Shrinkage is a potential issue that has to be addressed in resin-only plugs, but is less of an issue with the cast-in-place eutectic alloy base plug thereunder. The resin can be squeezed slightly against the metal base plug to insure adhesion to the well bore surfaces. This squeezing will compensate for shrinkage as it will enhance adhesion ensuring gas tightness of the well. With the metal bottom layer that forms a rock-to-rock seal, shrinking of resin in the present invention does not lead to plug failure as adhesion can be enhanced.

The traditional tests to confirm plug integrity can be used in evaluating the installed plug positive pressure tests and negative pressure tests, inflow tests, and the like. If logging is desired the plug could be drilled out and logged. The resin could contain a tracer of some sort for logging. However, generally cement P&A plugs are not drilled out, and are logged with pressure and tagging tests being the most common method of testing plugs.

Once in place and sufficiently sealing the wellbore, the remaining abandonment operations can proceed as normal.

The following references are incorporated by reference in their entirety.

US20060144591 Method and apparatus for repair of wells utilizing meltable repair materials and exothermic reactants as heating agents.

US20100006289 Method and apparatus for sealing abandoned oil and gas wells.

US20130333890 Methods of removing a wellbore isolation device using a eutectic composition.

US20130087335, Method and apparatus for use in well abandonment.

US20150345248, US20150368542, US20160145962, Apparatus for use in well abandonment.

US20150368542 Heat sources and alloys for us in downhole applications.

U.S. Pat. No. 6,474,414 Plug for tubulars.

U.S. Pat. No. 6,664,522 Method and apparatus for sealing multiple casings for oil and gas wells.

U.S. Pat. No. 6,828,531 Oil and gas well alloy squeezing method and apparatus.

U.S. Pat. No. 6,923,263 Well sealing method and apparatus.

U.S. Pat. No. 7,152,657 In-situ casting of well equipment.

U.S. Pat. No. 7,290,609, Subterranean well secondary plugging tool for repair of a first plug US20150053405 One trip perforating and washing tool for plugging and abandoning wells.

COP 42455, U.S. Ser. No. 62/402,821, Sep. 30, 2016.

COP 42425, U.S. Ser. No. 62/402,810, Sep. 30, 2016.

COP 42423, U.S. Ser. No. 62/402,802, Sep. 30, 2016.
COP 42472, U.S. Ser. No. 62/470,234, filed Mar. 11, 2017.

The invention claimed is:

1. A method of plugging a well, comprising:
a) deploying a first tool downhole to remove or open or perforate both an inner tubular and an exterior casing at a section of well to be plugged;
b) deploying a second tool downhole having a sleeve holding a heater therein and a base at a bottom of said sleeve, wherein a eutectic alloy is stored around an outside of said sleeve above said base, said heater being retrievable without retrieving said sleeve and base;
c) heating said eutectic alloy with said heater to form a molten alloy;
d) allowing said molten alloy to expand and solidify to form a cast-in-place metal plug having a height that fills all or part of said section of well to be plugged;
e) optionally performing substeps i)-v) one or more times to increase said height to a predetermined height:
 i) retrieving said heater and blocking said sleeve with a dummy,
 ii) adding pellets of said eutectic alloy to said section of well to be plugged,
 iii) replacing said dummy with said heater, and
 iv) heating said added pellets to form additional molten alloy, and
 v) expanding and solidifying said additional molten alloy;
f) retrieving said heater, but not said sleeve and base;
g) deploying a second material downhole on top of said cast-in-place metal plug; and,
h) curing said second material to form a single plug containing said eutectic alloy, said second material, said sleeve and said base, wherein said single plug has greater integrity under wellbore conditions than a same total height plug of said eutectic alloy alone or said second material alone.

2. The method of claim 1, wherein said second material is resin.

3. The method of claim 1, wherein said second material is cement.

4. The method of claim 1, wherein said single plug is less than 15 meters.

5. The method of claim 1, wherein said single plug is less than 5 meters.

6. The method of claim 1, wherein said single plug is less than 2 meters.

7. The method of claim 1, wherein said eutectic alloy is a bismuth alloy.

8. The method of claim 7, wherein said single plug is less than 5 meters.

9. A method of plugging a well, comprising:
a) deploying a first tool downhole to remove or open or perforate both an inner tubular and an exterior casing at a section of well to be plugged;
b) deploying a second tool downhole having a sleeve holding a heater therein and a base at a bottom of said sleeve, wherein a eutectic alloy is stored around an outside of said sleeve above said base, said heater being retrievable without retrieving said sleeve and base;
c) heating said eutectic alloy with said heater to form a molten alloy;
d) allowing said molten alloy to expand and solidify to form a cast-in-place metal plug having a height that fills part of said section of well to be plugged;
e) performing substeps i)-v) one or more times to increase said height to a predetermined height:
 i) retrieving said heater and blocking said sleeve with a dummy,
 ii) adding pellets of said eutectic alloy to said section of well to be plugged,
 iii) replacing said dummy with said heater,
 iv) heating said added pellets to form additional molten alloy, and
 v) expanding and solidifying said additional molten alloy;
f) retrieving said heater, but not said sleeve and base;
g) deploying a second material downhole on top of said cast-in-place metal plug; and,
h) curing said second material to form a single plug containing said eutectic alloy, said second material, said sleeve and said base, wherein said single plug has greater integrity under wellbore conditions than a same total height plug of said eutectic alloy alone or said second material alone.

10. The method of claim 9, wherein a dump bailer is used to add said pellets.

* * * * *